Feb. 24, 1925.
V. A. GIANETTO
1,527,476
COVER LOCK AND FILM MAGAZINE CLOSURE FOR CAMERAS
Filed Jan. 22, 1924
2 Sheets-Sheet 1
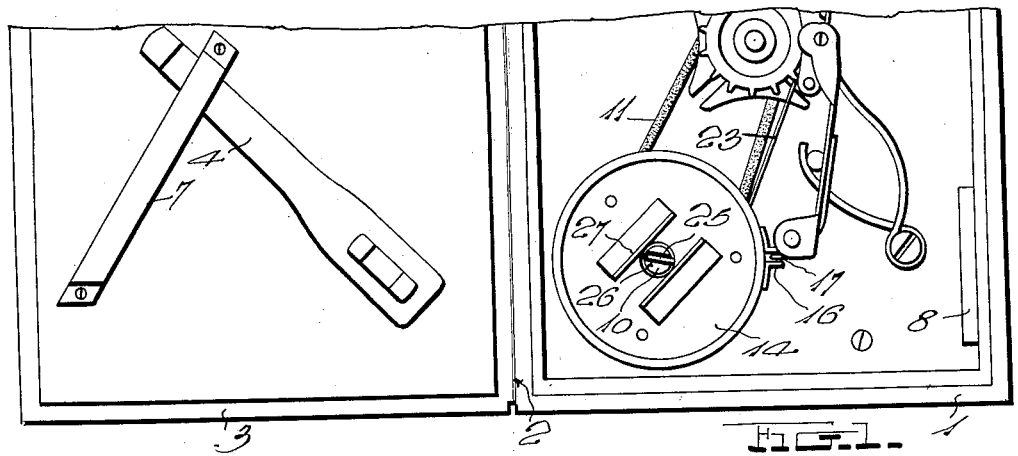
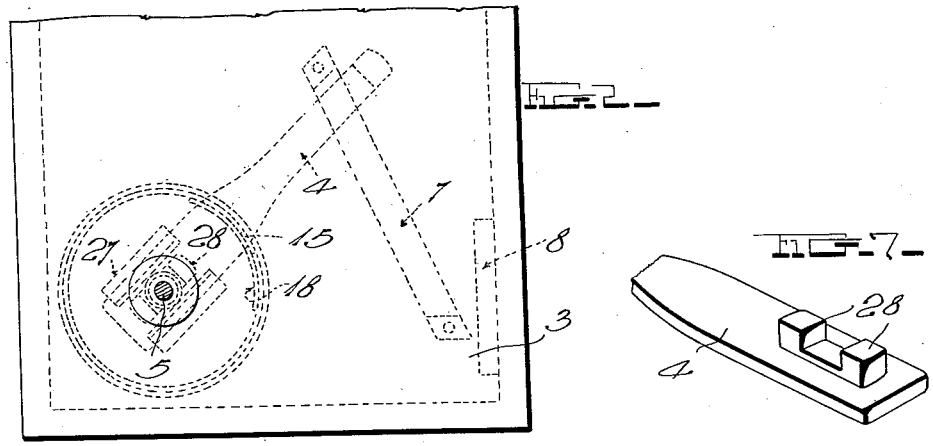
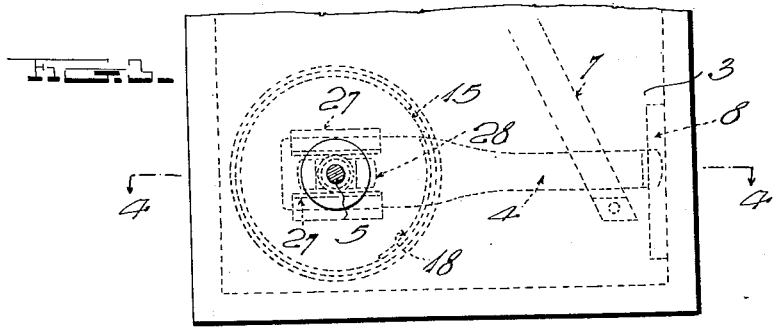
Inventor
Victor A. Gianetto
Witness
H. Woodard
By H. B. Wilson &co.
Attorneys Feb. 24, 1925.  
V. A. GIANETTO  
1,527,476  
COVER LOCK AND FILM MAGAZINE CLOSURE FOR CAMERAS  
Filed Jan. 22, 1924  2 Sheets-Sheet 2
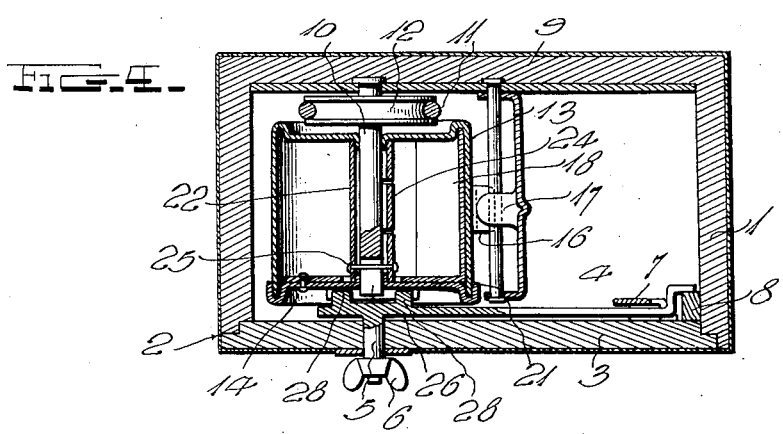
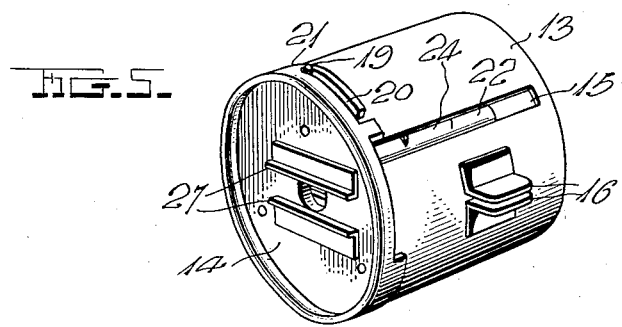
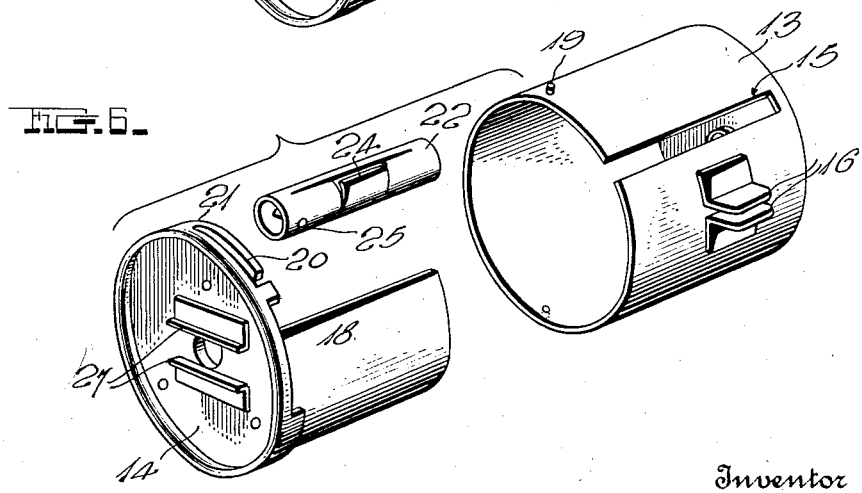
Inventor  
Victor A. Gianetto  
By H. R. Willson &Co  
Attorneys
Witness  
H. Woodard Patented Feb. 24, 1925.

1,527,476

UNITED STATES PATENT OFFICE.

VICTOR A. GIANETTO, OF NEW YORK, N. Y.

COVER LOCK AND FILM-MAGAZINE CLOSURE FOR CAMERAS.

Application filed January 22, 1924. Serial No. 687,826.

*To all whom it may concern:*

Be it known that I, VICTOR A. GIANETTO, a citizen of the United States, residing at New York, in the county of New York and State of New York, have invented certain new and useful Improvements in Cover Locks and Film-Magazine Closures for Cameras; and I do declare the following to be a full, clear, and exact description of the invention, such as will enable others skilled in the art to which it appertains to make and use the same.

This invention for improvements in cover locks and film magazine closures for cameras relates particularly to moving picture cameras in which a strip of undeveloped film is passed from one magazine to another disposed within the box or casing of the camera.

The invention has been designed in order to provide a means whereby a strip of undeveloped film contained in the box or casing of a camera will not be exposed and damaged in case the cover of the camera box is accidentally opened. According to the principles of the invention, the camera is provided with a cover locking means which automatically closes one of the film magazines when it is moved to unlocked position to permit the cover to be opened. This same means automatically opens the film magazine when operated to lock the cover of the camera shut.

The novelty in the invention resides in certain new combinations and arrangements of parts and various features of construction, all of which are hereinafter fully described and claimed, reference being made to the accompanying drawings, in which a practical embodiment of the invention is illustrated.

In the drawings:—

Fig. 1 is an elevation of a portion of the box and cover of a camera, which is equipped with mechanism constructed in accordance with the invention, this view illustrating the cover in open position;

Fig. 2 is an elevation of a portion of the camera, showing the cover in closed position, but before it is locked by the improved locking means;

Fig. 3 is a view similar to Fig. 2, showing the locking means in locked position;

Fig. 4 is a transverse sectional view through the camera, taken substantially on the plane indicated by the line 4—4 of Fig. 3;

Fig. 5 is a perspective view of the film magazine which forms a part of the mechanism constituting the invention;

Fig. 6 is a similar view of the parts constituting the film magazine showing such parts disassembled; and Fig. 7 is a detail perspective view of the locking bar 4 of Fig. 1.

Referring more particularly to the drawings in which similar reference characters are used to designate corresponding parts throughout the several views, it will be explained that the numeral 1 designates the box or casing of a moving picture camera. Hinged along one edge as at 2 to one side of the box 1, is a cover 3 for the camera box. This cover 3 is constructed so that when it is closed and locked, no light will enter the camera except through the lens thereof when the shutter is open.

Either the box 1 or the cover 3 is provided with a means for locking the cover shut. In the present instance this means is shown as being in the form of a locking bar 4 pivoted to swing substantially flat against the inside of the cover 3. The pivot 5 by which the bar 4 is connected to the cover 3 extends entirely through the cover and carries an operating knob 6 similar to an ordinary wing nut at its outer end. By turning the operating knob 6, the bar 4 may be swung upon its pivot from unlocked to locked position and vice versa. Secured to the inner side of the cover 3 is a strap or keeper 7, which forms a guide for the swinging end of the locking bar 4 to keep the latter flat against the inside of the cover and to limit its swinging movement in both directions.

One side of the box of the camera is provided with a bar 8, the rear edge of which forms a shoulder, which is engageable by the free end of the bar 4 when the latter is in closed or locked position to hold the cover 3 shut.

Rotatably mounted upon the back 9 of the camera box and extending transversely through the box toward the cover 3 when shut, is a spindle 10, upon which the film magazine, now to be described, is mounted. This spindle 10 is turned intermittently so as to take up the film as it is advanced across the exposure opening of the camera, the spindle being operated by means of a belt 11 which passes over a pulley 12 fitted on the spindle and some other pulley associated with the shutter actuating mechanism of the camera.

The film magazine which is mounted upon the spindle 10 consists of a pair of relatively turnable members 13 and 14. The inner member 13 is preferably cylindrical or tubular in shape, has its rear end closed, its front end open, is formed on one side with a slot or opening 15, and carries a pair of spaced projections 16, which are adapted to engage a lug 17 or other relatively stationary element of the camera, whereby to prevent this section 13 from turning.

The section or member 14 of the film magazine forms a cover for the open end of the section 13 and carries a closure 18 for the slot or opening 15. The section or member 14 is turnably mounted upon and with respect to the section 13 so that the closure 18 may be moved to and from a position to close the slot or opening 15.

In order to limit the turning movement of the section 14 with respect to the section 13, the latter is provided on opposite sides with pins 19 which fit in bayonet slots 20 formed in opposite sides of the annular flange 21 of the section 14. These elements not only limit the turning movement of the section 14 with respect to the section 13, but also serve to lock the section 14 onto the section 13.

Disposed within the film magazine and having a detachable driving connection with the spindle 10, is a spool 22, upon which the film 23 is wound. This spool is preferably tubular and surrounds the spindle 10 and has a resilient tongue 24 designed to grip one end of the film. Extending transversely through the spool 22 is a pin 25. This is adapted to fit into a notch 26 arranged in the spindle 10, and form with such notch, the means for obtaining the detachable driving connection between the spool and the spindle.

The locking bar 4 and the section 14 of the film magazine are provided with separable clutch members or inter-engaging elements designed and arranged so that the movement of the locking bar will turn the section 14. These elements include or comprise a pair of spaced parallel extending lugs 27 carried by the section or member 14 adjacent the axis thereof and constituting the driven clutch member, and one or more projections 28 projecting from the locking bar 4 adjacent the pivot thereof and constituting the driving clutch member. The projections 28 fit between the lugs 27, when the cover 3 is closed, so that when the operating knob 6 is turned so as to move the locking bar 4 so that its free end will swing back of the shoulder formed by the bar 8, the section 14 of the film magazine will be turned so as to move the closure 18 from behind or under the slot or opening 15 in the section 13. However, when the operating knob 6 is swung so as to move the locking bar 4 to unlocked position to permit the cover 3 to be opened, the projections 28 engaging the lugs 27 will turn the section or member 14 so as to cause the closure 18 to close the slot or opening 15 in the section 13. It will therefore be seen that as the cover 3 is unlocked to permit it to be opened, the film magazine will be closed so that when the cover is opened, the portion of the film contained in the film magazine will not be exposed and damaged. Only the portion of the film extending from the film magazine to the other film magazine of the camera will be exposed and damaged.

From the foregoing description, taken in connection with the accompanying drawings, the construction, use, operation and advantages of the invention will be readily understood. It will be obvious that numerous changes may be made without departing from the spirit and principle of the invention or sacrificing any of the advantages thereof, so it is to be understood that such changes may be made within the meaning and scope of the appended claims.

I claim:

1. The combination with a camera box having a cover, and means to lock said cover closed, of a film magazine mounted within said box and provided with an opening through which the film passes and with a turnably mounted member carrying a closure for said opening, and separable co-acting clutch members carried respectively by said member and said means and arranged to be brought into operative engagement when said cover is closed and to be separated when said cover is opened, said clutch members being adapted to open said closure when said cover is locked and to close said closure when said cover is unlocked.

2. The combination with a camera box having a cover, and means carried by said cover and engageable with said box to lock said cover closed, of a film magazine mounted within said box and provided with an opening through which the film passes and with a turnably mounted member carrying a closure for said opening, and separable co-acting clutch members carried respectively by said member and said means and arranged to be brought into operative engagement when said cover is closed and to be separated when said cover is opened, said clutch members being adapted to open said closure when said cover is locked and to close said closure when said cover is unlocked.

3. The combination with a camera box having a cover and a locking bar pivoted to the inside of said cover and adapted to engage the inside of said box to lock said cover closed, of a turnable operating member on the outside of said cover and directly connected to said locking bar to operate the same, a driving clutch member carried by said locking bar adjacent its pivot, a film magazine mounted entirely within said box and consisting of a relatively immovable member provided with an opening through which the film passes and of a turnably mounted member carrying a closure for said opening, and a driven clutch member carried by said turnably mounted member and positioned to be operatively engaged by said driving clutch member when said cover is closed, said clutch members co-operating to turn said turnably mounted member and open said closure when said locking bar is locked and to close said closure when said locking bar is unlocked.

In testimony whereof I have hereunto affixed my signature.

VICTOR A. GIANETTO.